March 23, 1943. R. CADWALLADER 2,314,326
LICENSE PLATE HOLDER AND LAMP ASSEMBLY
Filed June 11, 1941
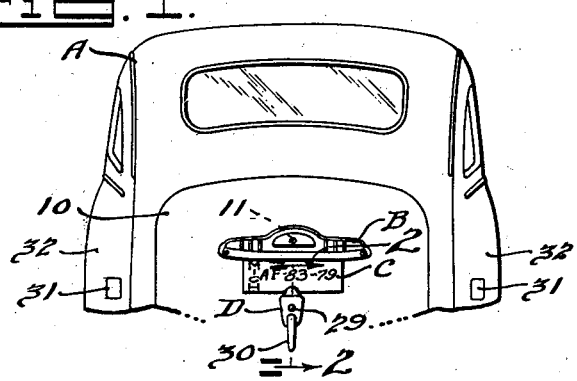
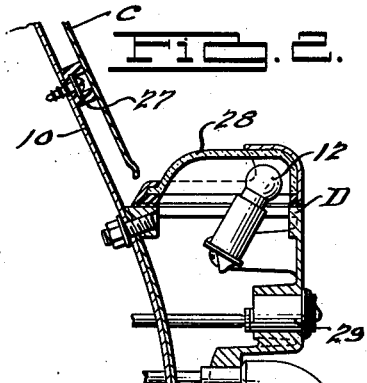
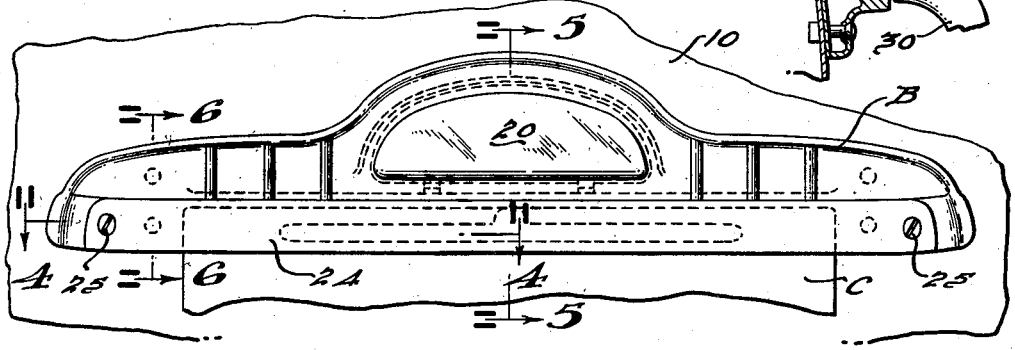
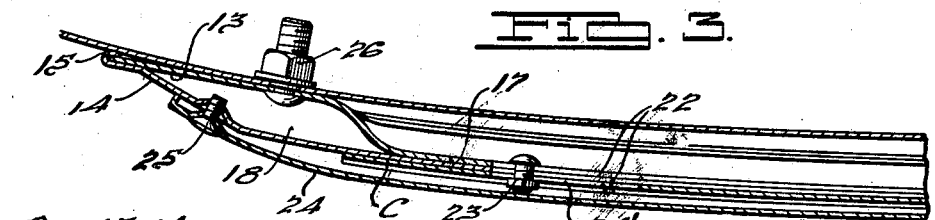
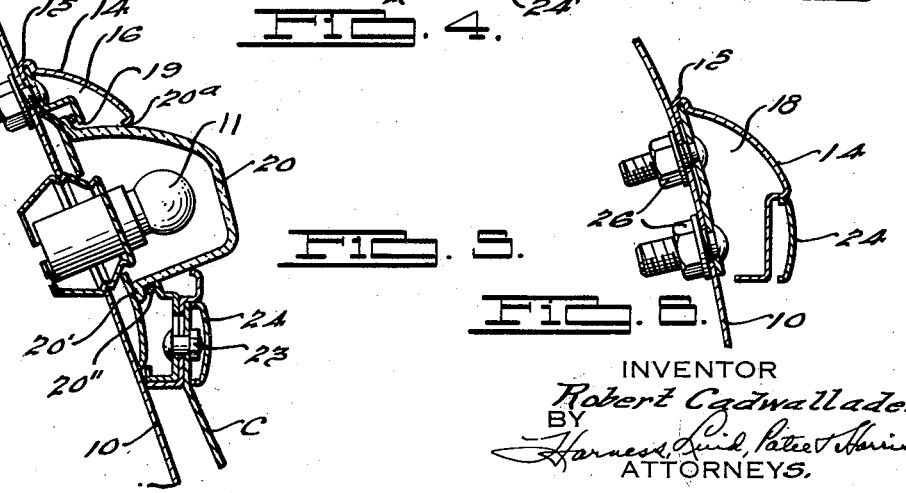
INVENTOR
Robert Cadwallader
BY
Harness, Dind, Pate & Harris
ATTORNEYS.

Patented Mar. 23, 1943

2,314,326

UNITED STATES PATENT OFFICE 2,314,326

LICENSE PLATE HOLDER AND LAMP ASSEMBLY

Robert Cadwallader, Detroit, Mich., assignor to Chrysler Corporation, Highland Park, Mich., a corporation of Delaware Application June 11, 1941, Serial No. 397,527

7 Claims. (Cl. 40—130)

This invention relates to motor vehicles and refers more particularly to improvements in combined license plate holders and lamp assemblies.

It is an object of my invention to provide an improved arrangement whereby the license plate will lie snugly without rattling adjacent the vehicle body part to which it is attached, such as to the rear luggage compartment closure, and to protect and conceal the fastenings of the plate with the assembly.

Another object is to provide a simple and easily assembled lens mounting.

Another object is to provide an assembly of simplified construction and which will lend itself to quantity production at relatively low cost.

Another object is to provide an improved system of license plate illumination and combined stop light and license plate carrier especially adapted for mounting on sloping rear panels of motor vehicle bodies, my system avoiding undesired projection of brackets and the like from the body panel.

Further objects and advantages of my invention will be more apparent as this specification progresses, reference being made to the accompanying drawing illustrating one embodiment of my invention and in which:

Fig. 1 is a partial rear elevational view of a motor vehicle showing my invention applied thereto.

Fig. 2 is a detail sectional elevational view taken as indicated by line 2—2 of Fig. 1.

Fig. 3 is an enlarged view of the license plate carrier as seen in Fig. 1.

Fig. 4 is a sectional plan view taken as indicated by line 4—4 of Fig. 3.

Fig. 5 is a transverse sectional view taken as indicated by line 5—5 of Fig. 3.

Fig. 6 is a detail sectional view taken as indicated by line 6—6 of Fig. 3.

Referring to the drawing I have shown my invention in connection with a motor vehicle A having the usual sloping hinged rear panel closure or lid 10 of the luggage compartment or deck on which is mounted the housing assembly B for a stop light bulb 11 and license plate C. Also mounted on panel 10 below housing B is a second housing assembly D for the light bulb 12.

The housing B comprises a hollow structure formed by inner stamping 13 and outer stamping 14, the latter having its side and top margins return bent at 15 around the corresponding edges of stamping 13 to hold the stampings assembled. Stampings 13 and 14 are spaced apart along the upper part of housing B to provide a rigid hollow section at 16, the lower portions of these stampings intermediate their ends being brought together in face contact at 17. Stampings 13 and 14 are spaced adjacent their end portions to provide hollow sections at 18 which are downward extensions of hollow section 16.

The stamping 13 has a flanged opening 19 for mounting a red stop light lens 20 within which is a stop light bulb 11 which, as customary, is energized by application of the vehicle wheel brakes. The lens 20 has a shoulder 20' which seats on the flange 19 through a seal 20" and projects through opening 20ᵃ of the outer stamping 14.

Stampings 13 and 14 are slotted at 22 where they are brought together at 17 in order to receive fasteners 23 and accommodate adjusting movement of these fasteners lengthwise of housing B so that the fasteners will fit the slots 24' of various license plates as the plate C. These fasteners 23 are concealed along with the upper edge portion of plate C by a trim strip 24 which extends below lens 20 and is secured adjacent its ends to the stamping 14 by fasteners 25 at hollow section 18. The housing B and plate C are secured as a unit to panel 10 by concealed fasteners 26 at hollow section 18.

Plate C slopes downwardly adjacent panel 10 and has its depending portion engaged with a rubber button 27 carried by panel 10 to prevent the plate from rattling. Secured to panel 10 so as to clear varying sizes of license plates is the assembly D having a white lens 28 arranged to illuminate plate C, this assembly having the usual lock 29 and handle 30 for the closure 10. The red tail lights 31 are mounted on the vehicle fenders 32.

By reason of my arrangement the plate C has its mounting fasteners 23 concealed in housing B and is arranged to slope closely along the compartment closure panel 10, the plate being illuminated by bulb 12 from below. In installations where the license plate C slopes adjacent the rear panel 10, as illustrated in Fig. 2, my arrangement of illuminating the plate from below has many advantages in comparison with efforts to illuminate the plate from above. For example, if housing B were employed in an effort to illuminate the plate from above, this would require location of the bulb and its lens outwardly from the panel 10 to an extent that would be unsightly and require a larger and more costly assembly and otherwise be undesirable. By reason of my invention, each of the bulbs 11 and 12 is located relatively closely to panel 10 without undue spacing rearwardly therefrom, thereby minimizing danger of breakage and presenting an illuminating system of desired efficiency. The housing B, in addition to mounting the plate C, also carries the stop light lens 20.

I claim:

1. A device for attaching a license plate to a motor vehicle surface comprising, an inner stamping adapted to be attached to said surface, an outer stamping having return-bent edge portions engaged by edge portions of the inner stamping, said return-bent portions being disposed between said edge portions of the inner stamping and said surface, said outer stamping having an opening, said inner stamping having a flanged opening, a lens bearing against the flange of said flanged opening and projecting through the opening of said outer stamping, attaching means for securing the license plate to at least one of said stampings so that said plate depends beneath said lens, and a finish strip overlying said attaching means.

2. A lens mounting for a motor vehicle surface, comprising, an inner stamping adapted to be attached to said surface, an outer stamping having return-bent edge portions engaged by edge portions of the inner stamping, said return-bent portions being disposed between said edge portions of the inner stamping and said surface, said outer stamping having an opening, said inner stamping having a flanged opening, and a lens bearing against the flange of said flanged opening and projecting through the opening of said outer stamping.

3. A lens and license plate mounting for a motor vehicle panel, comprising, inner and outer stampings having portions of their margins engaged with each other, said stampings having relatively spaced portions defining a hollow section, a lens and cooperating light source mounted in said hollow section, said lens projecting outwardly from said outer stamping, said stampings having intermediate portions thereof brought together adjacent said hollow section, and fastening means for mounting said license plate on said brought-together portions so as to depend below said lens.

4. A lens and license plate mounting for a motor vehicle panel, comprising, inner and outer stampings having portions of their margins engaged with each other, said stampings having relatively spaced portions defining a hollow section, a lens and cooperating light source mounted in said hollow section, said lens projecting outwardly from said outer stamping, said stampings having intermediate portions thereof brought together adjacent said hollow section, fastening means for mounting said license plate on said brought-together portions so as to depend below said lens, and a finish strip secured to said outer stamping and concealing said fastening means.

5. A license plate mounting for a motor vehicle panel comprising, inner and outer stampings having portions of their end margins engaged with each other and intermediate portions brought together, said stampings being relatively separated at a region above said brought-together portions and also between said marginal portions and said brought-together portions thereby defining hollow cross-sections continuously extending from above said brought-together portions to regions adjacent the ends of said stampings, a license-plate-illuminating lens projecting from the first said region, and securing means for attaching the license plate to said brought-together portions.

6. A license plate mounting for a motor vehicle panel comprising, inner and outer stampings having portions of their end margins engaged with each other and intermediate portions brought together, said stampings being relatively separated between said marginal portions and said brought-together portions thereby defining hollow cross-sections adjacent the ends of said stampings, securing means for attaching the license plate to said brought-together portions, and a finish strip overlying said securing means and connected to said outer stamping at said hollow cross-sections.

7. In a combined stop-light and license plate carrier for a rear panel of a motor vehicle, a laterally elongated housing structure, a lens and cooperating stop light disposed within said housing, fastening means for attaching the license plate to said housing so as to depend therefrom adjacent said panel, and a finish strip overlying said fastening means and attached to said housing.

ROBERT CADWALLADER.